March 13, 1956  F. G. MANESS  2,737,926
POULTRY AND EGG TRAP NEST
Filed Nov. 14, 1952  2 Sheets-Sheet 1

INVENTOR.
FRANK G. MANESS
BY
McMorrow, Berman + Davidson
ATTORNEYS

March 13, 1956  F. G. MANESS  2,737,926
POULTRY AND EGG TRAP NEST
Filed Nov. 14, 1952  2 Sheets-Sheet 2

INVENTOR.
FRANK G. MANESS
BY
McMorrow, Berman & Davidson
ATTORNEYS

United States Patent Office 2,737,926
Patented Mar. 13, 1956

2,737,926
POULTRY AND EGG TRAP NEST
Frank Gilbert Maness, Shady Cove, Oreg.

Application November 14, 1952, Serial No. 320,389

2 Claims. (Cl. 119—47)

This invention relates to poultry nests, and more particularly to an improved turkey hen egg-laying nest.

The main object of the invention is to provide a novel and improved poultry nest of the type wherein only a single hen can be accommodated at one time, preventing the hen from being disturbed by other poultry and allowing the hen to leave the nest freely after egg-laying.

A further object of the invention is to provide an improved egg-laying nest for use by turkey hens and similar fowl, the nest being simple in construction, being relatively compact in size, and affording protection to a hen against disturbance by other poultry during egg-laying.

A still further object of the invention is to provide an improved poultry nest which is automatically closed after a hen has entered the nest, whereby the hen is protected from disturbance by other poultry during egg laying, and which is arranged to allow the hen to leave the nest freely after egg laying, the improved nest being inexpensive to construct, being durable, and being provided with means for automatically collecting the eggs as they are laid and protecting the eggs against damage.

Further objects and advantages of the invention will become apparent from the following description and claims, and from the accompanying drawings, wherein:

Figure 2:
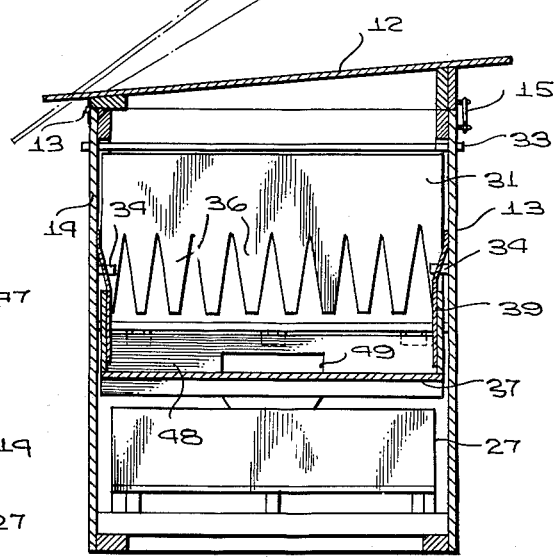
Figure 2 is a vertical transverse cross sectional view taken on the line 2—2 of Figure 1.

Referring to the drawings, the nest is designated generally at 11 and comprises a generally rectangular housing having the sloping top 12, said top being hinged at one longitudinal margin of the housing, as shown at 13, whereby the top may be readily swung upwardly, as for example to the dotted view position thereof shown in Figure 2, to provide access to the interior of the housing. The hinged top 12 may be suitably provided with waterproof covering to shed water from the housing. As is further illustrated, the top 12 overlaps the side walls of the housing by a substantial amount to further protect the housing against rain or other weather conditions.

The side walls of the housing are shown respectively at 13 and 14, and the top 12 may be detachably secured to the side wall 13 by means of a conventional latch, shown at 15.

Designated at 16 is a vertically movable closure member which is slidably mounted in respective vertical guide tracks 17, 17 provided at the forward ends of the respective housing walls 14 and 13. The lower portions of the side walls 14 and 13 project forwardly from the transverse vertical plane of the slidable closure 16, as shown at 18 and 19 and are connected by the transverse vertical end wall 20. Mounted on the top edges of the extensions 18 and 19 is the horizontal platform 21 which leads to the doorway defined between the vertical guide structures 17, 17. The closure member 16 is of a sufficient height to at times close off said doorway when raised to the elevated position thereof shown in dotted view in Figure 3. In its lowered position, shown in full line view in Figure 3, the slidable closure 16 is in a completely non-obstructing position relative to the doorway, allowing a hen to freely enter the forward end of the housing.

Figure 1:
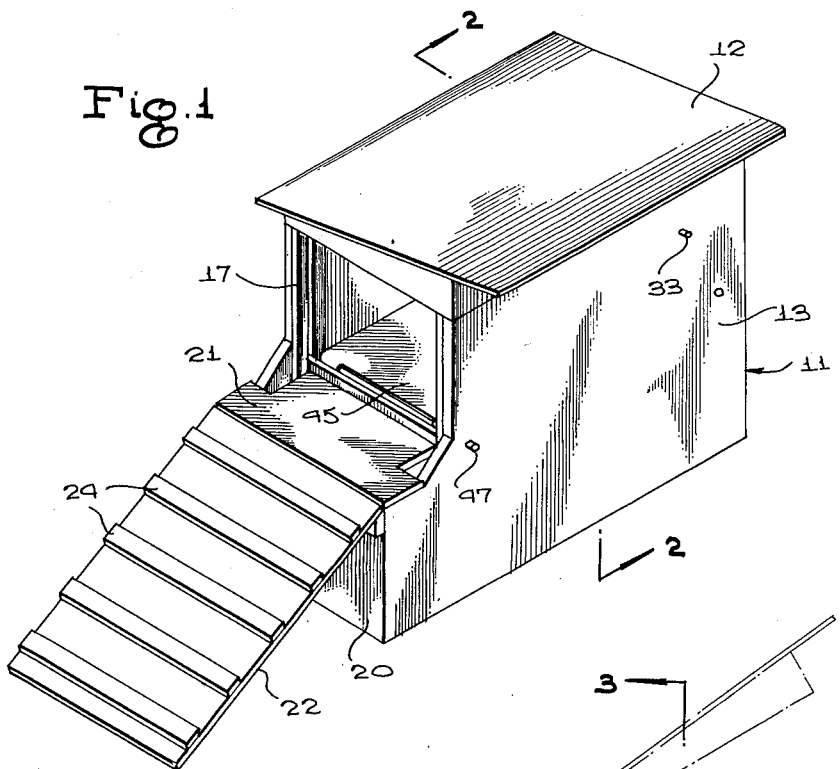
Figure 1 is a perspective view of an improved turkey hen's nest constructed in accordance with the present invention.
Figure 4:
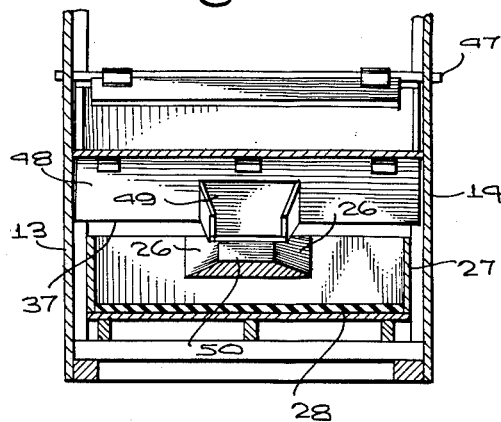
Figure 4 is a transverse vertical cross sectional detail view taken on the line 4—4 of Figure 3.

Designated at 22 is an inclined ramp which is secured at its upper end to a transverse cleat 23 attached to the top margin of the vertical transverse wall 20, the opposite end of the ramp 22 resting on the ground. The ramp is provided with the transverse, elevated treads 24, said treads being spaced, as shown in Figures 1 and 3, and affording a footing for poultry ascending to the platform 21.

Secured in the rear portion of the housing and extending longitudinally in said housing is the exit platform 25, said platform extending across the entire width of the housing. Slidably supported in the rear portion of the housing beneath the exit platform 25 is the egg drawer 27, said egg drawer underlying the platform 25 and extending for substantially the entire internal width of the housing. The egg drawer is provided with the external panel 27 having the handle 28, whereby the drawer may be at times pulled rearwardly out of the housing to a sufficient extent to allow the eggs collected therein to be removed. The drawer is provided with the lining 28 of deformable, soft resilient material, such as sponge rubber or the like, to protect the eggs against breakage, the lining 28 having the sloping top surface, shown at 29, whereby the eggs tend to roll gently toward the rear portion of the drawer after entering said drawer from the discharge chute of the nest presently to be described.

Figure 3:
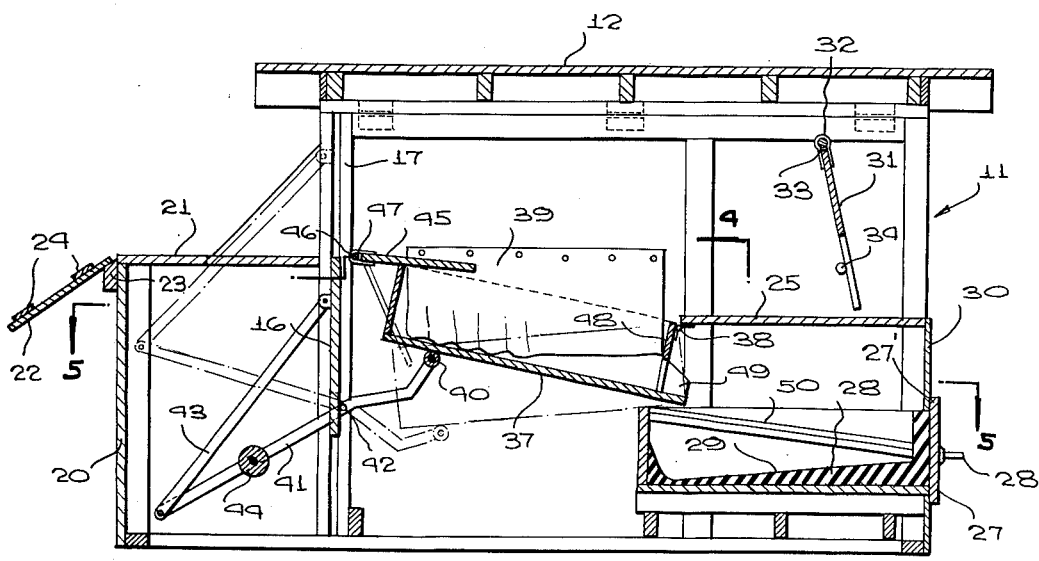
Figure 3 is a longitudinal vertical cross sectional view taken on the line 3—3 of Figure 2.

As shown in Figure 3, the platform 25 is at an elevation substantially midway between the bottom of the housing and the roof 12, the rear end of the platform 25 being provided with the vertical transverse wall 30 which is engaged by the top marginal portion of the panel 27' of the egg drawer 27 when the drawer is in its closed position, as shown in Figure 3. Designated at 31 is the rear closure member of the housing which comprises a flat panel transversely hinged at its top edge to the upper portion of the housing, as shown at 32, said panel being secured for example to a transversely extending rod 33 which is journaled in the upper portions of the side walls 13 and 14 of the housing, whereby the closure panel 31 may swing freely around a transverse horizontal axis. As shown in Figure 3, the panel 31 normally rests against inwardly projecting stop pins 34, 34 secured in the side walls 13 and 14 and limiting clockwise swinging movement of the panel 31, as viewed in Figure 3.

As shown in Figure 3, the panel 31 normally rests against the stop pins 34 and is biased against said pins by gravity, while at the same time defining a closure which is protected against inward swinging from the outside. However, the closure panel 31 is free to swing outwardly, namely, in a counterclockwise direction as viewed in Figure 3, whereby a hen in the nest may freely leave the nest by pushing outwardly against the panel 31. The panel 31 is formed at its lower margin with the spaced serrations 36 which are sufficiently closely spaced to prevent a fowl from entering the nest or from disturbing the hen in the nest. As shown in Figures 2 and 3, the lower ends of the serrations 36 extend relatively close to the horizontal rear platform 25.

Designated at 37 is the rectangular nesting box which is hinged at 38 to the forward transverse margin of the horizontal rear platform 25 and which is disposed in the forward portion of the housing. The nesting box 37 extends substantially for the entire internal width of the housing. Designated at 39, 39 are respective draped side cloths which extend into the side portions of the nesting box 37, said cloths being secured to the internal surfaces of the respective side walls 13 and 14, said cloths being provided to prevent breakage of eggs. As shown, the cloths depend for a substantial length and portions thereof rest on the floor of the nesting box 37. The cloths may comprise sheets of canvas tacked to the respective side walls 13 and 14 and extending substantial distances over the bottom of the nest 37, serving as padding for the nest bottom.

Figure 5:
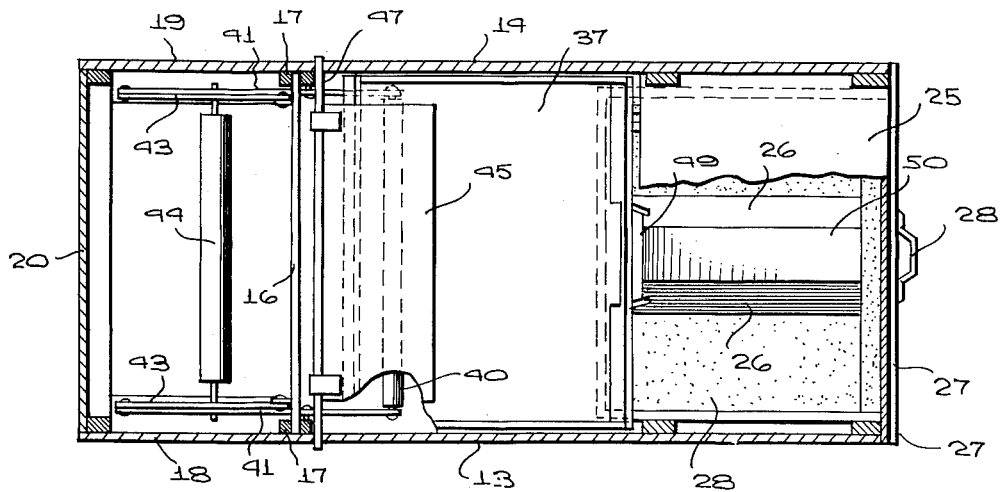
Figure 5 is a horizontal cross sectional view taken on the line 5—5 of Figure 4.

The nest box 37 is normally supported in a forwardly and upwardly inclined position, as shown in Figure 3, by a transverse roller 40 which engages the forward portion of the bottom wall of the nest box. The roller 40 is rotatably secured between the rear ends of a pair of longitudinally extending lever bars 41, 41 pivoted respectively at 42, 42 to the lower portions of the guide tracks 17, 17 for swinging movement in respective vertical longitudinal planes. The forward ends of the lever bars 41, 41 are respectively connected to the side marginal portions of the vertical sliding panel 16 by respective link bars 43, 43. The lever bars 41, 41 are biased counterclockwise, as viewed in Figure 3, by a transversely extending weighted roller 44 secured between the forward portions of said lever bars, as shown in Figures 3 and 5. The weighted roller 44 biases the levers 41 counterclockwise and hence causes the roller 40 to bear upwardly against the forward portion of the bottom of the nest box 37, maintaining the nest box in the forwardly and upwardly inclined position thereof shown in Figure 3, the forward transverse wall of the box engaging against a hinged, transversely extending leaf or apron 45 which is hinged transversely at 46, as by being secured to a transversely extending hinge rod 47 rotatably supported in the respective side walls 13 and 14 substantially flush with the horizontal plane of the doorway sill element 21. The nest box 37 is provided with the transversely extending rear wall 48 which is provided at its intermediate portion with the discharge chute 49. Secured in the egg drawer 27 in longitudinal alignment with the discharge chute 49 is the downwardly and rearwardly inclined egg receiving ramp 50 which is provided with the sloping side walls 26, 26, serving to gently conduct eggs discharged from the chute 49 downwardly and laterally to the padded bottom member 28 of the egg drawer. The exit platform 25 extends transversely over the egg drawer for substantially the entire internal width of the housing, and its rear depending wall element 30 prevents access to the egg drawer when the drawer is in its normal closed position, shown in Figure 3.

In operation, when a hen enters the front doorway of the housing and steps into the egg box 37, the weight of the hen causes the box to descend to the dotted view position thereof shown in Figure 3, causing the vertically slidable panel 16 to be elevated to its closed position, thus preventing other hens or poultry from entering the housing to disturb the hen therein. After egg laying, the hen may leave the housing by pushing outwardly against the rear hinged door 31, at which time the egg box 37 is released and is elevated by the biasing action of the transverse weighted roller 44 to its normal, full line position shown in Figure 3. Thus, when the hen has left the housing, the sliding panel 16 descends to the position thereof shown in full line view in Figure 3, opening the front doorway and allowing the next hen to enter the nest. The eggs roll down the bottom of the nest box 37 and through the chute 49 onto the egg ramp 50, and thence laterally to the padded bottom 28 of the egg drawer 27. The eggs, thus collected, are immediately deposited in the egg drawer and are hidden from view of the hens so that no difficulty is encountered in taking the eggs from the hens.

The nest is thus arranged to allow hens to successively enter the housing, deposit their eggs and immediately leave the housing, the front doorway being opened as soon as the hen leaves the housing, whereby the next hen can immediately enter the housing and lay its egg. The eggs are collected in a safe and efficient manner, and the eggs may be removed when a sufficient quantity has collected in the egg drawer 27.

While a specific embodiment of an improved poultry nest has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A poultry nest comprising a housing, an elevated entrance opening at one end of the housing, a vertically movable closure member slidably mounted in said one end of said housing for vertical movement in said entrance opening, a nesting tray pivotally mounted inside said housing adjacent said entrance opening, said tray being pivoted at its end remote from said opening, lever means pivoted at its intermediate portion in said housing adjacent said entrance opening, follower means on the inner end portion of said lever means underlying and engaging the surface of said tray adjacent said entrance opening and being movable longitudinally along said surface, link means connecting the outer end portion of said lever means to said closure member and being formed and arranged to elevate said closure member to closed position responsive to depression of the end of said tray adjacent said opening by a hen, means biasing said tray to an inclined position with its end adjacent said entrance opening of the housing elevated with respect to the opposite pivoted end of the tray, an egg-receiving receptacle arranged subadjacent said opposite end of said tray, said tray being formed with an egg discharge passage at said opposite end of the tray, a downwardly inclined egg ramp aligned with said passage, a depending second closure member hinged at its top end to the opposite end of the housing, said second closure member being swingable outwardly to allow egress of a hen from the housing, and an inclined ramp at said one end of the housing leading to said entrance opening.

2. A poultry nest comprising a housing, an elevated entrance opening at one end of the housing, a vertically movable closure member slidably mounted in said one end of said housing for vertical movement in said entrance opening, a nesting tray pivotally mounted inside said housing adjacent said entrance opening, said tray being pivoted at its end remote from the entrance opening, lever means pivoted at its intermediate portion in said housing adjacent said entrance opening, follower means on the inner end portion of said lever means underlying and engaging the bottom surface of said tray adjacent said entrance opening and being movable longitudinally along said bottom surface, link means connecting the outer end portion of said lever means to said closure member and being formed and arranged to elevate said closure member to closed position responsive to depression of said tray by a hen, means biasing said tray to an inclined position with its end adjacent said entrance opening of the housing elevated with respect to the opposite end of the tray, an egg-receiving receptacle arranged subadjacent said opposite end of said tray, said tray being formed with an egg discharge passage at said opposite end of the tray, an inclined egg ramp aligned with said discharge passage at one end and having the lower end thereof terminating in said receptacle, and a depending second closure member hinged in the opposite end of the housing, said second closure member being swingable outwardly to allow egress of a hen from the housing.

References Cited in the file of this patent

UNITED STATES PATENTS

| | | |
|---|---|---|
| 1,565,476 | Little et al. | Dec. 15, 1925 |
| 1,751,141 | Forster et al. | Mar. 18, 1930 |
| 1,824,557 | Loehr | Sept. 22, 1931 |
| 1,940,017 | Rumpel | Dec. 19, 1933 |
| 2,108,287 | Kellum | Feb. 15, 1938 |